O. J. RICE.
CANVAS ADJUSTER.
APPLICATION FILED DEC. 19, 1919.
1,347,121.                        Patented July 20, 1920.
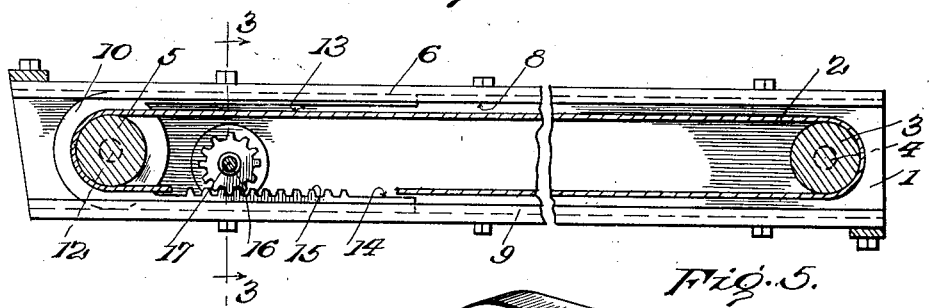
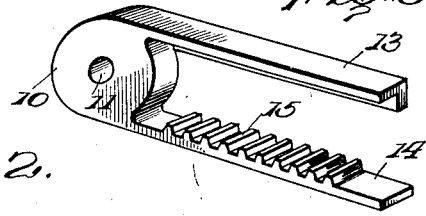
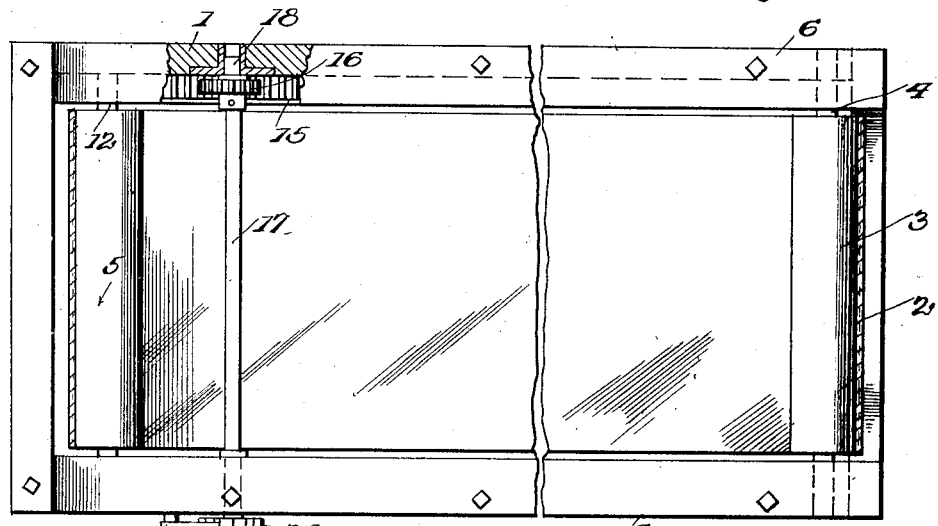
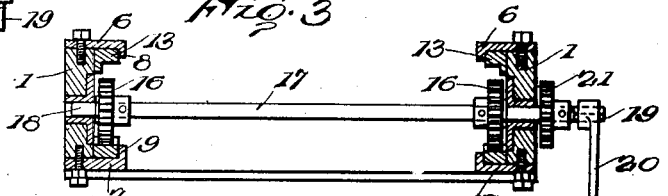
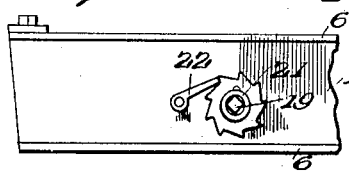
Inventor
Oscar J. Rice.
by Lacey & Lacey,
his Attys

UNITED STATES PATENT OFFICE.

OSCAR J. RICE, OF LIBBY, MONTANA.

CANVAS-ADJUSTER.

1,347,121.  Specification of Letters Patent.  Patented July 20, 1920.

Application filed December 19, 1919. Serial No. 345,957.

*To all whom it may concern:*

Be it known that I, OSCAR J. RICE, a citizen of the United States, residing at Libby, in the county of Lincoln and State of Montana, have invented certain new and useful Improvements in Canvas-Adjusters, of which the following is a specification.

This invention relates to devices for adjusting the tension of an endless conveyer canvas or apron, such, for example, as employed upon harvesting and similar agricultural machines. It is a well known fact that inasmuch as a conveyer canvas when employed in connection with such machines is subjected to widely varying temperature and humidity changes it is necessary to frequently take up the slack or slacken the canvas in order that the same may travel properly. The present invention, therefore, aims to provide a device which may be quickly and conveniently operated for the purpose of varying the tension of the canvas to suit varying conditions and one object of the invention is to so construct the device that the adjustable roller of the canvas will be evenly adjusted, both ends thereof being simultaneously moved in the same direction and the same distance.

A further object of the invention is to so construct the adjusting device that the same will in no way interfere with the proper travel of the canvas and may be operated without placing oneself in position where injury would be liable to result in the event of the draft animals becoming frightened.

Another object of the invention is to so construct the adjusting device that the same will not be liable to become in any way distorted or disarranged after having been operated to suitably tension the canvas.

In the accompanying drawings:

Figure 1 is a vertical longitudinal sectional view through an endless conveyer of the type heretofore mentioned, a portion of the adjusting device being shown in elevation;

Fig. 2 is a top plan view of said conveyer, a portion of the adjusting device being shown in top plan;

Fig. 3 is a vertical transverse sectional view on the line 3—3 of Fig. 1;

Fig. 4 is a side elevation of one end of the conveyer, illustrating the means for holding the adjusting device after the same has been operated to tension the canvas;

Fig. 5 is a perspective view of one of the adjustable bearings for the adjustable roller of the conveyer.

The conveyer, as is usual, includes spaced side boards, indicated by the numeral 1, and the canvas which is indicated by the numeral 2, passes over a nonadjustable roller 3 having trunnions 4 journaled in suitable bearings in the side boards 1 at one end thereof and also over a second roller, indicated by the numeral 5, which is to be adjusted by the device embodying the present invention.

The adjusting device embodying the present invention includes two counter-part members which are slidably supported upon the inner faces of the side boards 1 and to provide for the support of each of these members there are secured upon the upper and lower edges of the said side boards guides 6 and 7 which project inwardly beyond the plane of the inner face of the side board upon which they are secured and which respectively have downwardly and upwardly extending flanges 8 and 9. Each of the adjustable members heretofore mentioned comprises a head 10 which is substantially circular in form and which is provided with a bearing 11 for the trunnions 12 of the adjustable roller 5. Extending from the head 10 of each member in parallel relation are spaced upper and lower arms, indicated respectively by the numerals 13 and 14. Each member is disposed against the inner face of its respective side board 1 with its arms 13 and 14 respectively slidably engaging the guides 6 and 7 and retained in position by the flanges 8 and 9 which engage the edges of the said arms, as clearly shown in Fig. 3 of the drawings. The arm 14 is provided upon its upper face with a longitudinal series of rack teeth 15 and meshing with the rack teeth of the two members are pinions 16 fixed upon a shaft 17 which at one end is journaled in a suitable bearing 18 in one of the side boards 1 and at its other end is similarly journaled but extends beyond the outer face of the adjacent side board and is squared at its extremity, as indicated by the numeral 19, for the application thereto of a crank handle 20. It will now be understood that by engaging the crank handle with the squared end of the shaft 17 and rotating the said shaft, the roller 5 may be adjusted toward or away from the roller 3 so as to slacken or tighten the canvas as may be required. In order that the shaft 17 may be held against backward rotation, a ratchet 21 is fixed upon the last-mentioned end thereof inwardly of the squared extremity 19, and a pawl 22 is pivoted upon the adjacent side board and coacts with the ratchet for the purpose stated.

It will be understood that by the engagement of the arms 13 and 14 within the guide channels formed by the members 6 and 7 and their respective flanges 8 and 9, the members comprising the heads 10 and arms 13 and 14 will be held steady and against relative displacement although they may be readily simultaneously adjusted in the manner above stated.

Having thus described the invention, what is claimed as new is:

In a device of the class described, spaced supporting members, spaced upper and lower guides carried by each of said members, a member assembled with each of said supporting members and comprising a head and spaced arms extending therefrom, the said arms slidably engaging the upper and lower guides upon the said supporting member, a roller journaled between the heads of the second-mentioned members, one arm of each of said second-mentioned members being of rack formation, a shaft journaled in the supporting members, and pinions carried by the said shaft meshing with the said racks.

In testimony whereof I affix my signature.

OSCAR J. RICE. [L. S.]